H. W. CURTIS.
Belt-Shifters.

No. 148,353. Patented March 10, 1874.

Witnesses:

Inventor:
H. W. Curtis
Per
Attorneys.

UNITED STATES PATENT OFFICE.

HARRISON W. CURTIS, OF PHILADELPHIA, PENNSYLVANIA, ASSIGNOR TO JOSEPH L. FERRELL, OF SAME PLACE.

IMPROVEMENT IN BELT-SHIFTERS.

Specification forming part of Letters Patent No. 148,353, dated March 10, 1874; application filed February 7, 1874.

*To all whom it may concern:*

Be it known that I, HARRISON W. CURTIS, of Philadelphia, in the county of Philadelphia and State of Pennsylvania, have invented a new and Improved Mechanical Movement, of which the following is a specification:

My invention consists of an arrangement of the idle-pulleys used for turning a driving-belt out of a right line for a belt-shifter by mounting them on a swinging frame in a line cutting the center of the angle between the two lines in which the belt runs.

Figure 1:
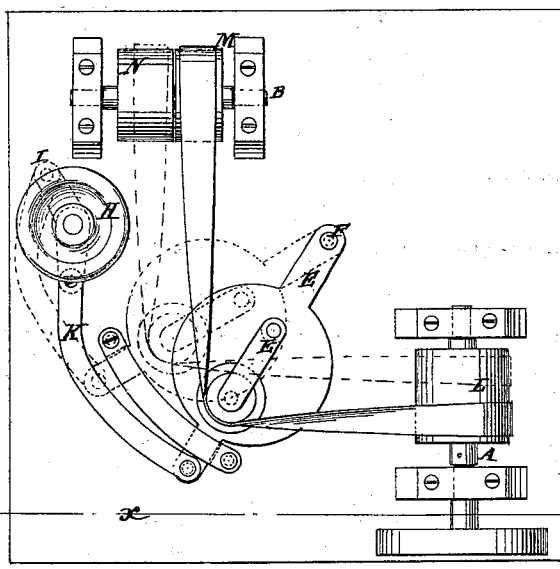
Figure 2:
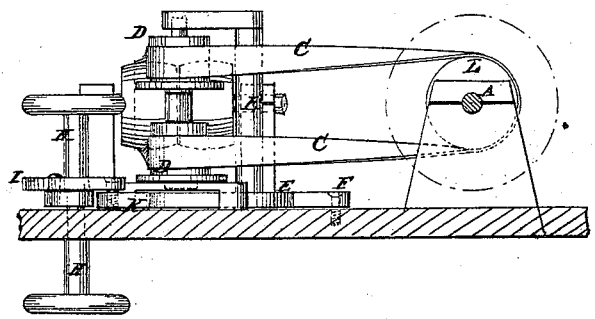

Figure 1 is a plan view of my improved machine, and Fig. 2 is a section of Fig. 1 on the line *x x*.

Similar letters of reference indicate corresponding parts.

A is the driving-shaft, and B the shaft to be driven. They are, in this example, arranged at right angles to each other, but may be at any angle. C is the belt, and D the idle-wheels for guiding it. Said wheels are mounted on the swinging frame E, which is pivoted at F, so as to swing forward to the position represented by the dotted lines G, and back to the position in which it stands, and it is provided with the rock-shaft H, arm I, and connecting-rod K, for shifting it from one position to the other. Any other approved means may be employed for this purpose. The driving-pulley L is made wide for the belt to traverse it, as on others where the belt is to be shifted, and a loose pulley, M, is arranged by the side of the pulley for driving the shaft B. The shifting of the idle-pulleys forward and back on the axis F changes their relation to the drivers and the driven pulley, as clearly indicated in Fig. 1, so that they serve for all the purposes of a shifter, besides swing for the belt-guide, and thus save the expense of a counter-shaft, which would otherwise have to be used in addition.

Having thus described my invention, I claim as new and desire to secure by Letters Patent—

The combination, with the pulleys L, N, and M, and belt C, of the shifting idle-pulley D and a shifting device, substantially as shown and described.

HARRISON W. CURTIS.

Witnesses:
  H. C. HOOD,
  A. J. FERRELL.